(12) United States Patent
Takahashi et al.

(10) Patent No.: US 8,235,699 B2
(45) Date of Patent: Aug. 7, 2012

(54) HONEYCOMB STRUCTURE-FORMING DIE AND METHOD FOR MANUFACTURING THE SAME

(75) Inventors: Hironori Takahashi, Nagoya (JP); Hirofumi Hosokawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 395 days.

(21) Appl. No.: 12/393,459

(22) Filed: Feb. 26, 2009

(65) Prior Publication Data

US 2009/0232927 A1    Sep. 17, 2009

(30) Foreign Application Priority Data

Mar. 17, 2008 (JP) ................... 2008-067870

(51) Int. Cl.
*B29C 47/20* (2006.01)
(52) U.S. Cl. .......... 425/190; 29/558; 228/161; 228/174; 425/380; 425/461; 425/467
(58) Field of Classification Search .......... 425/190, 425/192 R, 380, 461, 467; 264/177.12; 29/558; 228/161, 174
See application file for complete search history.

(56) References Cited

U.S. PATENT DOCUMENTS

| | | | |
|---|---|---|---|
| 4,653,996 A * | 3/1987 | Ozaki et al. | 425/461 |
| 4,875,264 A * | 10/1989 | Inoue et al. | 76/107.1 |
| 2005/0118296 A1 | 6/2005 | Kaneko et al. | |
| 2005/0147707 A1 * | 7/2005 | Nate et al. | 425/380 |
| 2006/0034972 A1 | 2/2006 | Takahashi et al. | |
| 2008/0078920 A1 | 4/2008 | Takahashi et al. | |
| 2008/0113858 A1 | 5/2008 | Kaneko et al. | |

FOREIGN PATENT DOCUMENTS

| | | |
|---|---|---|
| JP | A-7-246610 | 9/1995 |
| JP | A-2000-326318 | 11/2000 |
| JP | A-2003-285308 | 10/2003 |
| JP | A-2006-051682 | 2/2006 |
| JP | A-2007-181976 | 7/2007 |

OTHER PUBLICATIONS

Feb. 3, 2012 European Search Report issued in EP09250690.6.

* cited by examiner

*Primary Examiner* — Yogendra Gupta
*Assistant Examiner* — Joseph Leyson
(74) *Attorney, Agent, or Firm* — Oliff & Berridge, PLC

(57) ABSTRACT

A honeycomb structure-forming die 1 has a die substrate 22 including a first plate-shaped member 23 having back holes 6 for introducing a raw forming material and a second plate-shaped member 24 having slits 5 for forming the material into a lattice shape. The first plate-shaped member 23 has columnar portions 8 where at least a part is zoned by a slit-shaped groove portion 7 corresponding with a shape of the slit 5 on a bonding face side 28 where the first plate-shaped member 23 is bonded with the second plate-shaped member 24. In the columnar portions 8, the ratio (L/T) of the height L of the columnar portions 8 to the minimum width T in an end face on the bonding face side 28 is within 1/3 to 3.5. Thus constituted die realizes high formability, and two plate-shaped members constituting the die substrate are hardly peeled from each other.

11 Claims, 11 Drawing Sheets

HONEYCOMB STRUCTURE-FORMING DIE AND METHOD FOR MANUFACTURING THE SAME

BACKGROUND OF THE INVENTION AND RELATED ART STATEMENT

The present invention relates to a honeycomb structure-forming die and a method for manufacturing the honeycomb structure-forming die. More preferably, the present invention relates to a honeycomb structure-forming die which realize high formability and where two plate-shaped members constituting the die substrate are hardly peeled from each other and a manufacturing method thereof.

As a method for manufacturing a ceramic honeycomb structure, heretofore, there has widely employed a method by extrusion-forming using a honeycomb structure-forming die (hereinbelow sometimes referred to simply as a "die") provided with a die substrate having back holes for introducing a raw forming material (kneaded clay) and slits having a lattice shape or the like and communicating with the back holes. Generally, the die is provided with lattice-shaped slits having a width corresponding to the partition wall thickness of the honeycomb structure on a face on one side of the die substrate and back holes each having a large area and communicating with the slits on a surface on the opposite side (surface on the other side). Generally, the back holes are disposed so as to correspond with the position where slits in a lattice shape or the like cross each other, and the back holes and the slits communicate with each other inside the die substrate. Therefore, a raw forming material such as a ceramic raw material introduced from the back holes moves from the back holes having a relatively large inner diameter to the narrow slits and extruded from opening portions of the slits as a honeycomb structured formed article (honeycomb formed article).

As the die substrate constituting such a honeycomb structure-forming die, there is employed, for example, a die substrate of a plate-shaped member constituted of one kind of alloy such as a stainless alloy or a carbide alloy or a die substrate obtained by laminating and bonding a plate-shaped member for forming slits and a plate-shaped member for forming back holes together (see, e.g., JP-A-2000-326318 and JP-A-2003-285308).

For the plate-shaped member for forming the back holes, there has been proposed a manufacturing method for a honeycomb structure-forming die, the method includes a step for forming grooves corresponding with a shape of the slits so that the slits can suitably be processed after bonding (see, e.g., JP-A-2006-51682)

As such a method for manufacturing a honeycomb structure-forming die, there has been disclosed a method where, upon bonding the two plate-shaped members with a bonding material (brazing material), they are heated at a temperature where the bonding material melts or higher with reducing pressure in the heating atmosphere to a pressure lower than vapor pressure of the brazing material to obtain the die substrate (JP-A-2007-181976). According to such a manufacturing method, the amount of residual bonding material in the die substrate can be reduced.

However, in the case that grooves are formed in the plate-shaped member for forming back holes as in JP-A-2006-51682 and JP-A-2007-181976, there arises a problem that the bonded two plate-shaped members are easily peeled from each other to easily cause defective bonding.

SUMMARY OF THE INVENTION

The present invention has been made in view of such a problem of prior art and provides a honeycomb structure-forming die which realize high formability and where two plate-shaped members constituting the die substrate are hardly peeled from each other and a manufacturing method thereof.

As a result of the inventors' keen study in order to solve the aforementioned problem of prior art, they found out that, in the case of forming grooves in the plate-shaped member for forming back holes as described above, the aforementioned problem can be solved by specifying the minimum width of the columnar portions zoned by the grooves and height of the columnar portions in a specific range, which led to the completion of the present invention. Specifically, according to the present invention, there are provided the following honeycomb structure-forming die and manufacturing method thereof.

[1] A honeycomb structure-forming die comprising a die substrate having a first plate-shaped member provided with back holes for introducing a raw forming material and a second plate-shaped member provided with slits for forming the raw forming material into a lattice shape, wherein the first plate-shaped member has a plurality of columnar portions where at least a part is zoned by a slit-shaped groove portion corresponding with a shape of the slit on a bonding face side where the first plate-shaped member is bonded with the second plate-shaped member, and, in the columnar portions, the ratio (LIT) of the height L of the columnar portions to the minimum width T in an end face on the bonding face side is within the range from 1/3 to 3.5.

[2] The honeycomb structure-forming die according to the above [1], wherein the columnar portions are zoned by an outer peripheral edge of the back hole and the groove, and the minimum width T is shown by a value (Q−2r) obtained by deducting radii of closest two back holes from a distance Q between the centers of the two back holes.

[3] The honeycomb structure-forming die according to the above [1] to [2], wherein the second plate-shaped member is constituted of a tungsten based carbide alloy.

[4] The honeycomb structure-forming die according to any one of the above [1] to [3], wherein the first plate-shaped member is constituted of a metal or an alloy capable of causing at least one phase transformation selected from the group consisting of martensitic transformation, bainitic transformation, and pearlitic transformation by cooling an austenite phase.

[5] A method for manufacturing a honeycomb structure-forming die comprising: a step (1) for forming lattice-shaped grooves on a surface on one side of the first plate-shaped member of metal or alloy, a step (2) for obtaining a die substrate by disposing the second plate-shaped member of metal or alloy on the surface on the one side of the first plate-shaped member to bond the first plate-shaped member with the second plate-shaped member, and a step (3) for obtaining a honeycomb structure-forming die by forming slits corresponding to a shape of the grooves from the surface on the side opposite to the bonding face bonded with the first plate-shaped member of the second plate-shaped member; wherein the honeycomb structure-forming die has a plurality of columnar portions where at least a part is zoned by the groove on a surface on the one side of the first plate-shaped member constituting the die substrate, and the groove portions are formed in the step (1) in such a manner that the ratio (L/T) of the height L of the columnar portions to the minimum width T of the columnar portions is in the range from 1/3 to 3.5.

[6] The method for manufacturing a honeycomb structure-forming die according to the above [5], wherein a member constituted of a tungsten based carbide alloy is used as the second plate-shaped member.

[7] The method for manufacturing a honeycomb structure-forming die according to the above [5] or [6], wherein a member constituted of a metal or an alloy capable of causing at least one phase transformation selected from the group consisting of martensitic transformation, bainitic transformation, and pearlitic transformation by cooling an austenite phase is used as the first plate-shaped member.

[8] The method for manufacturing a honeycomb structure-forming die according to any one of the above [5] to [7], wherein back holes for introducing the raw forming material at the time of forming are formed in the first plate-shaped member in the step (1).

In a honeycomb structure-forming die of the present invention, since groove portions are formed in the first plate-shaped member in such a manner that the aforementioned ratio (L/T) is within the specific range, the bonding portion between the columnar portion and the second plate-shaped member has high peeling strength, and the two plate-shaped members constituting the die substrate are hardly peeled from each other.

In addition, by the aforementioned groove portions, surplus bonding material used for the bonding can be evaporated and removed by heating upon bonding, and the bonding material can effectively be inhibited from remaining in the back hole or the like. This enables to realize high formability.

In addition, by a method for manufacturing a honeycomb structure-forming die of the present invention, such a honeycomb structure-forming die of the present invention can simply be manufactured at low costs.

Figure 1:
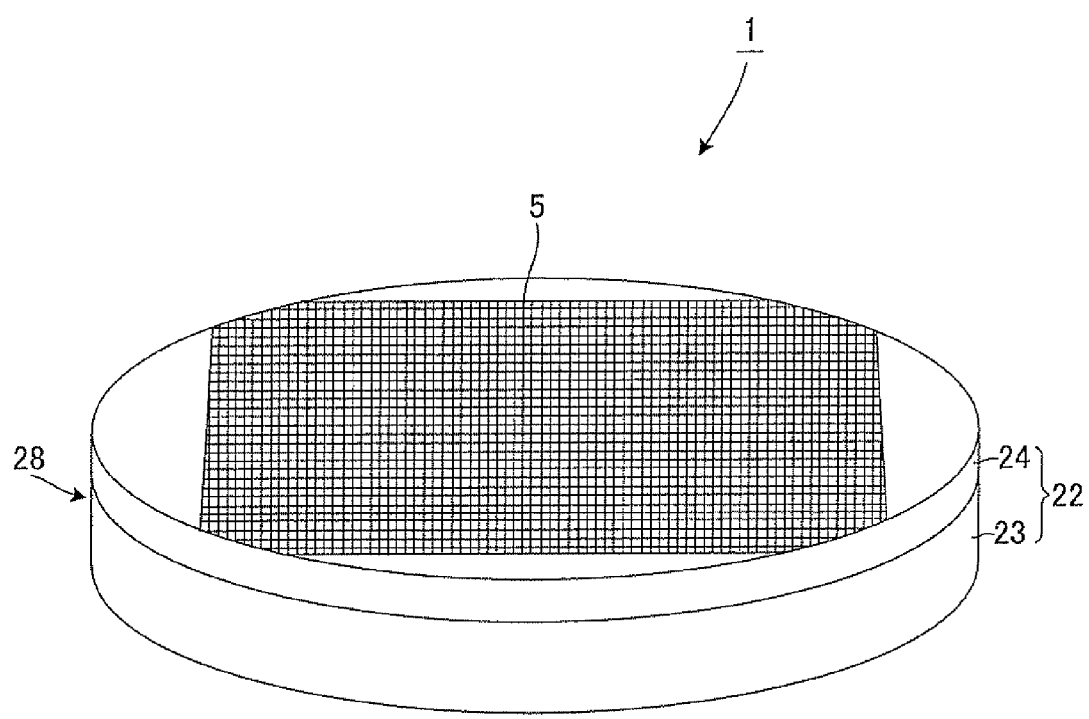
FIG. 1 is a perspective view schematically showing one embodiment of a honeycomb structure-forming die of the present invention.

REFERENCE NUMERALS 1, 1a, 1b, 1c: honeycomb structure-forming die (die), 5: slit, 6: back hole, 7: groove portion, 8: columnar portion, 12: honeycomb structure, 13: partition wall, 14: cell, 22: die substrate, 23: plate-shaped member (first plate-shaped member), 24: plate-shaped member (second plate-shaped member), 28: bonding face, 28a: bonding interface, P: load, P1: shearing load, P2: peeling load

DETAILED DESCRIPTION OF THE INVENTION

Hereinbelow, embodiments of a honeycomb structure-forming die (hereinbelow sometimes referred to simply as a "die") and a manufacturing method thereof of the present invention will be described in detail. However, the present invention is by no means limited to these embodiments, and various changes, modifications, and improvements maybe made on the basis of knowledge of a person of ordinary skill as long as they do not deviate from the scope of the present invention.

Figure 2:
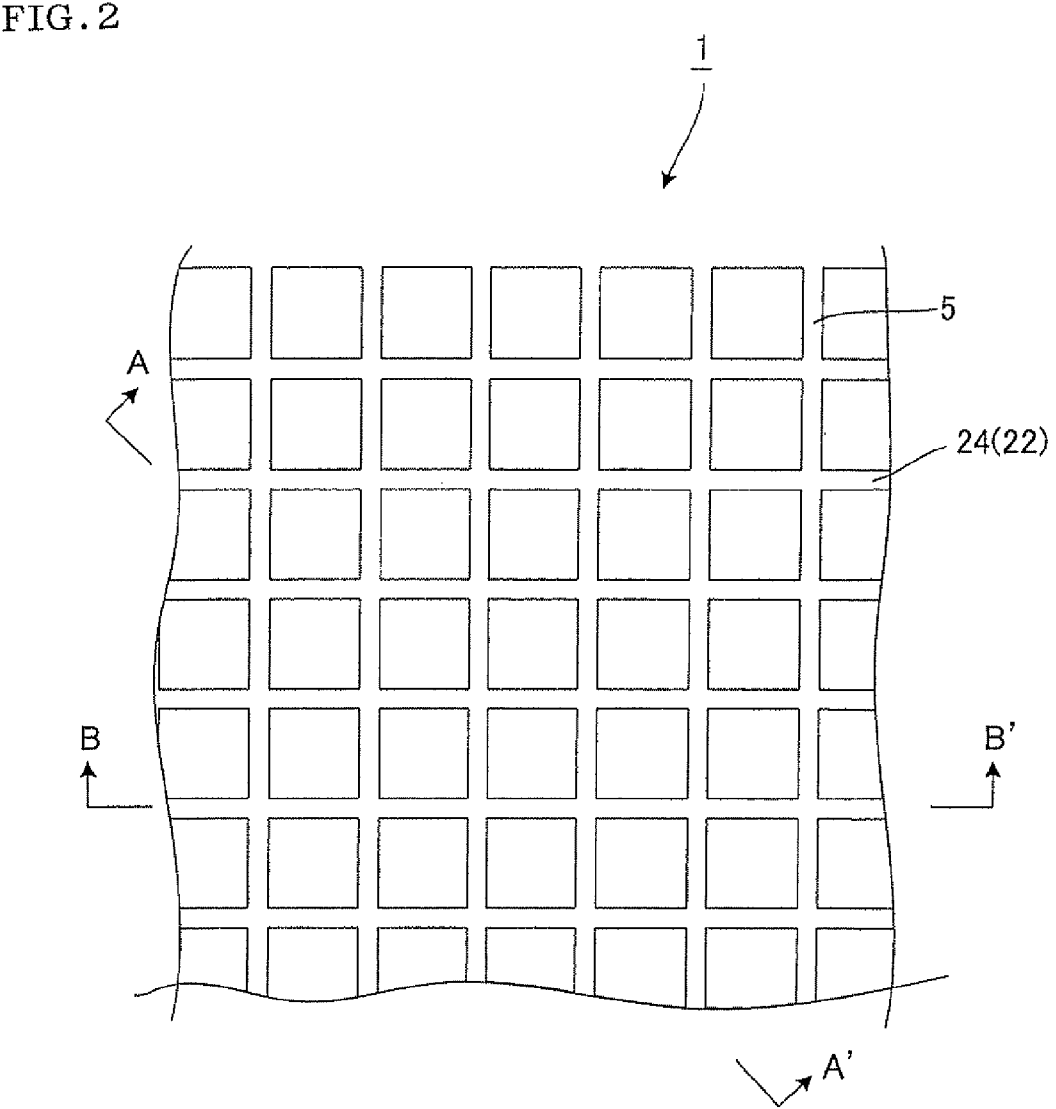
FIG. 2 is an enlarged plan view showing a surface of the honeycomb structure-forming die shown in FIG. 1.
Figure 3:
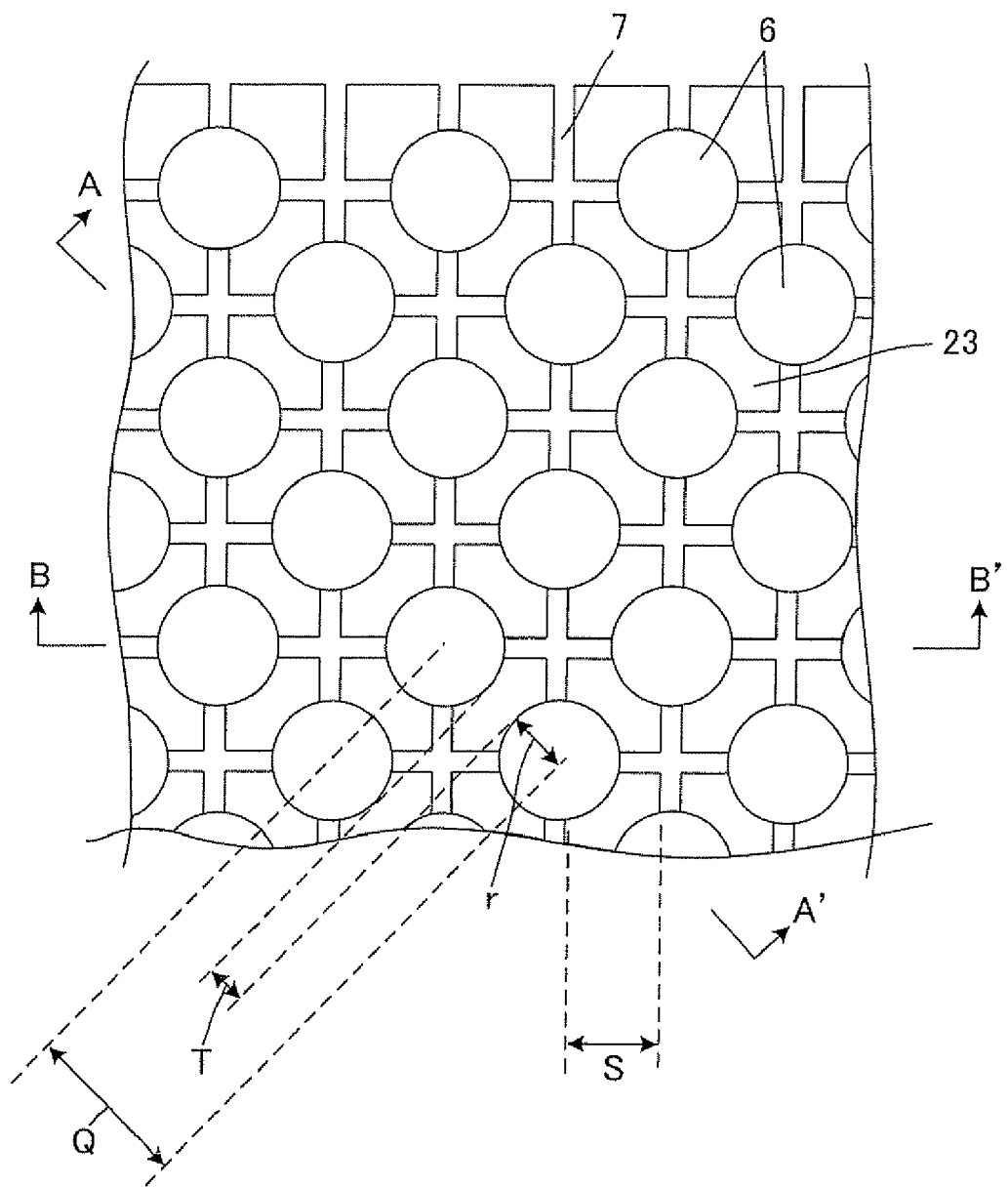
FIG. 3 is an enlarged plan view showing a surface on the bonding face side of the first plate-shaped member constituting the honeycomb structure-forming die shown in FIG. 1.
Figure 4:
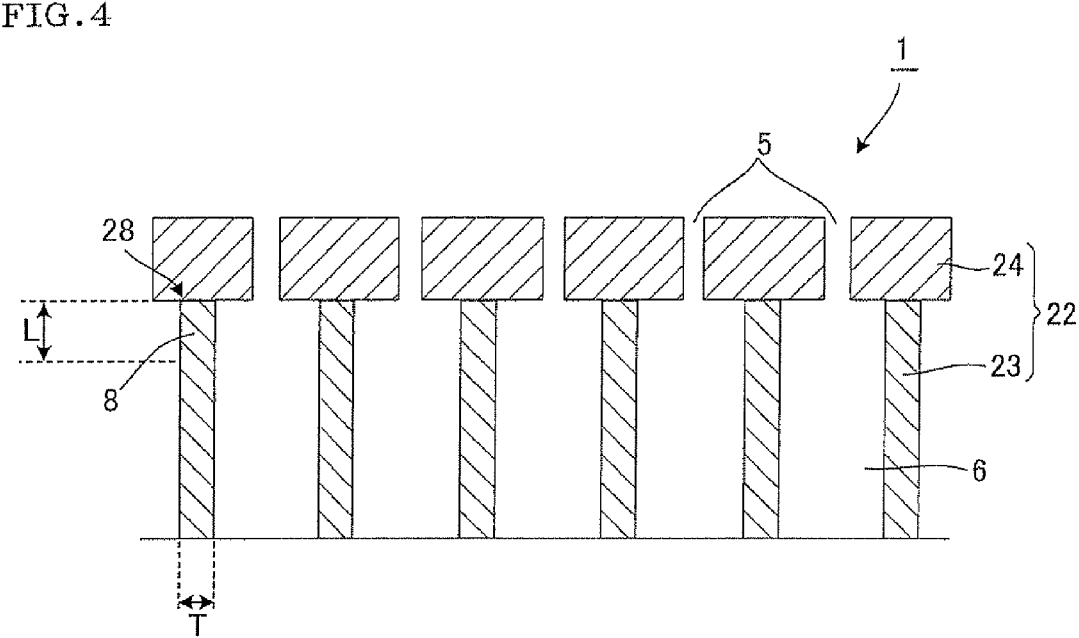
FIG. 4 is a schematic cross-sectional view showing a cross section obtained by cutting the honeycomb structure-forming die shown in FIG. 2 along the A-A' line.
Figure 5:
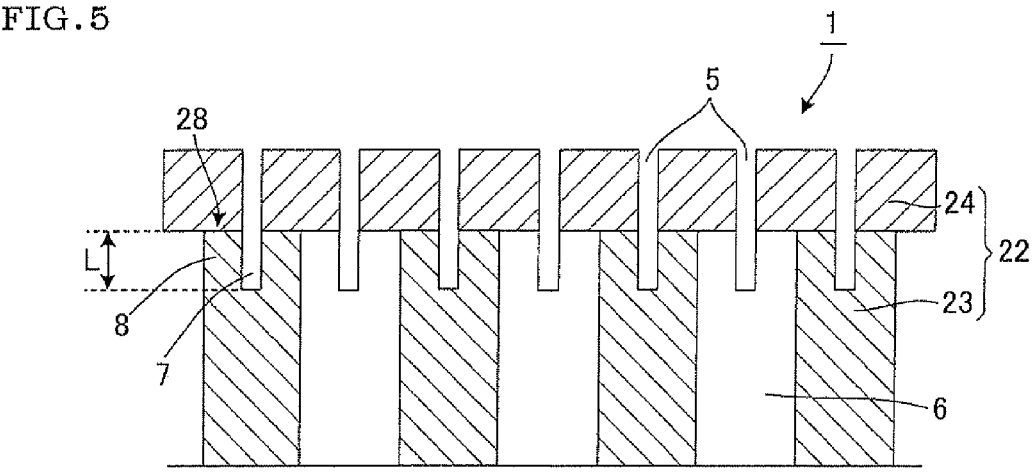
FIG. 5 is a schematic cross-sectional view showing a cross section obtained by cutting the honeycomb structure-forming die shown in FIG. 2 along the B-B' line.

[1] Honeycomb structure-forming die:

First, an embodiment of a honeycomb structure-forming die of the present invention will be described specifically. FIG. 1 is a perspective view schematically showing one embodiment of a honeycomb structure-forming die of the present invention. FIG. 2 is an enlarged plan view showing a surface of the die shown in FIG. 1, and FIG. 3 is an enlarged plan view showing a surface on the bonding face side of the first plate-shaped member constituting the die shown in FIG. 1. In addition, FIG. 4 is a schematic cross-sectional view showing a cross section obtained by cutting the die shown in FIG. 2 along the A-A' line, and FIG. 5 is a schematic cross-sectional view showing a cross section obtained by cutting the die shown in FIG. 2 along the B-B' line.

As shown in FIGS. 1 to 5, a honeycomb structure-forming die 1 of the present embodiment is a die provided with a die substrate 22 having the first plate-shaped member 23 having back holes 6 for introducing a raw forming material and the second plate-shaped member 24 having slits 5 for forming the raw forming material into a lattice shape.

In the first plate-shaped member 23, slit-shaped grooves 7 each corresponding with the shape of the slits 5 are formed on the bonding face side where the first plate-shaped member 23 is bonded with the second plate-shaped member 24. The first plate-shaped member 23 has a plurality of columnar portions 3 where at least a part is zoned by the groove portion 7. Incidentally, the groove portions 7 are formed in such a manner that the back holes 6 locate at the intersections of the groove portions 7.

In a honeycomb structure-forming die 1 of the present embodiment, the columnar portions 8 are constituted in such a manner that the ratio (L/T) of the height L of the columnar portion 8 to the minimum width T in the end face on the bonding face 28 side of the first plate-shaped member 23 is within the range from 1/3 to 3.5.

By such a constitution, two plate-shaped members 23 and 24 constituting the die substrate 22 are hardly peeled from each other, and slits 5 can be processed well to the die substrate 22. In addition, surplus bonding material (specifically, brazing material) used for bonding the plate-shaped members 23 and 24 together can be evaporated and removed by heating upon bonding through the groove portions 7, thereby inhibiting the bonding material from remaining in the back holes 6 or the like.

The first plate-shaped member 23 and the second plate-shaped member 24 are bonded together by bonding the tips of the columnar portions 8 and a surface of the second plate-shaped member 24, and portions corresponding with the groove portions 7 and the back holes 6 on the surface of the first plate-shaped member 23 are not actually bonded.

Figure 6:
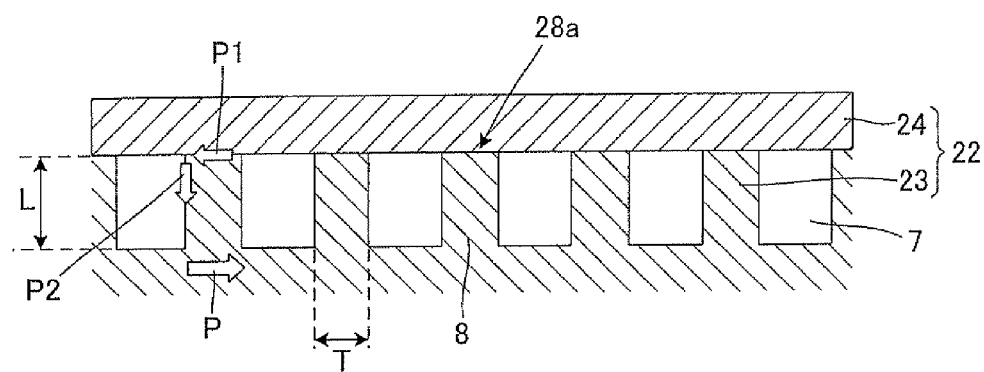
FIG. 6 is a cross-sectional view illustrating a honeycomb structure-forming die.

For example, as shown in FIG. 6, when a load P is applied on the bonding interface 28a between the first plate-shaped member 23 and the second plate-shaped member 24 from the left side of the drawing toward the right side in parallel with the bonding interface 28a, a shearing load P1 in parallel with the bonding interface 28a and a peeling load P2 perpendicular to the bonding interface 28a (i.e., axial direction of the columnar portions 8) are generated.

Generally, in the case of bonding as shown in FIG. 6, the structure can withstand more under a shearing load P1 than under a peeling load P2. Therefore, by determining the ratio (L/T) of the minimum width of the columnar portions where the shearing load P1 acts to the height L of the columnar portions where the peeling load P2 acts in an optimum range, a balance between the peeling load and the shearing load in the bonding interface 28a is achieved so that the structure can withstand the loads, where the two plate-shaped members 23 and 24 constituting the die substrate 22 can hardly be peeled from each other and damaged. The optimum ratio (L/T) is within the range from 1/3 to 3.5 as described above.

Figure 7:
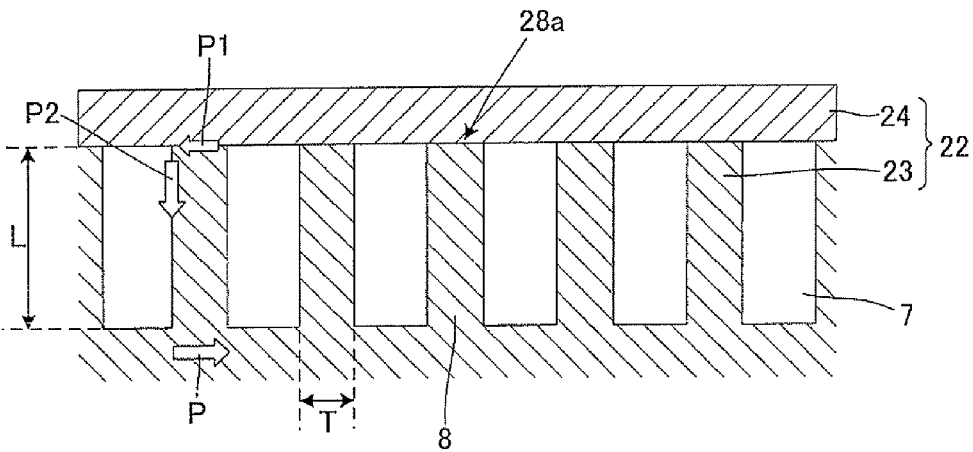
FIG. 7 is a cross-sectional view illustrating a honeycomb structure-forming die.

For example, when the ratio (L/T) is above 3.5, as shown in FIG. 7, the length L is too large with respect to the minimum width T, and an extremely large peeling load P2 with respect to the load P is generated, and thereby the two plate-shaped members 23 and 24 constituting the die substrate 22 are easily peeled from each other.

Figure 8:
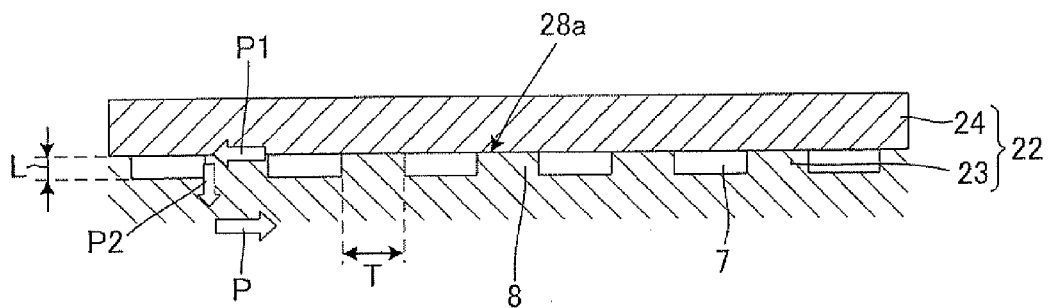
FIG. 8 is a cross-sectional view illustrating a honeycomb structure-forming die.

On the other hand, when the ratio (L/T) is below 1/3, as shown in FIG. 8, the length L is too small with respect to the minimum width T, and an extremely large shearing load P1 with respect to the load P is generated. In this case, though the two plate-shaped members 23 and 24 are hardly peeled from each other, the aforementioned effect of removing the bonding material cannot be obtained because of too small groove portions 7.

The ratio (L/T) is within the range of preferably 0.5 to 3, more preferably 0.9 to 2.5. Such a constitution can provide a die excellent in both the effect in inhibiting the plate-shaped members from being peeled from each other and the effect in removing the bonding material.

Incidentally, the "minimum width T" of the columnar portions means the minimum length among the line segments passing through the centers of the end faces of the columnar portions and bisecting the area of each end face in the bonding face side of the first plate-shaped member. In addition, the "height L" of the columnar portions mean the length from the end face of the columnar portions to the bottom face of the groove portions.

Figure 9:
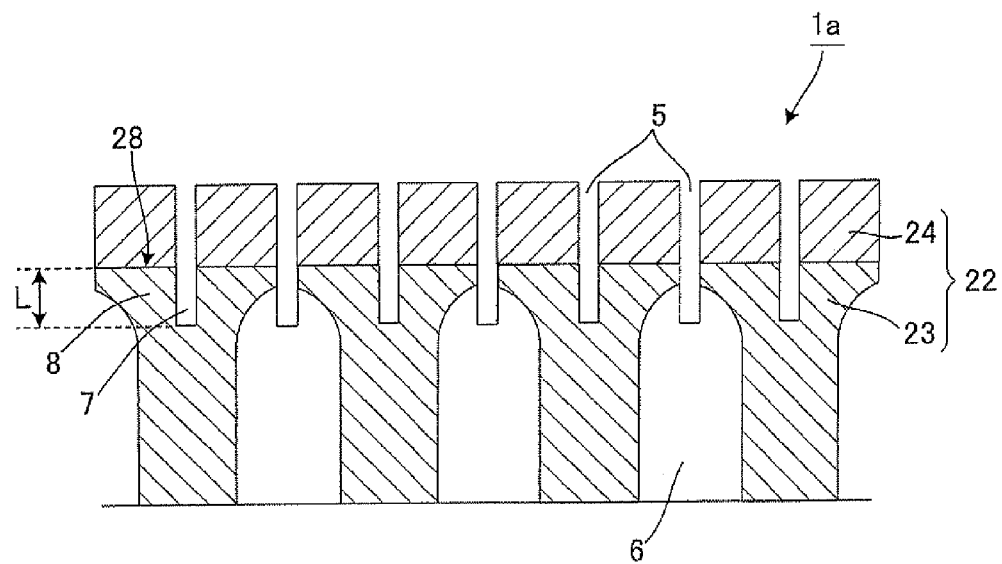
FIG. 9 is a schematic cross-sectional view showing a cross section of another embodiment of a honeycomb structure-forming die of the present invention, the cross-section being similar to that of FIG. 5.

Incidentally, in the case that the inner diameter (diameter) of the back holes is smaller than the width of the groove portions, or, for example, as a honeycomb structure-forming die 1a shown in FIG. 9, in the case that the back holes 6 do not pass through to the surface 28 of the first plate-shaped member 23, that is, in the case that the back holes 6 reaches the bottom faces of groove portions 7 to form blind holes, the columnar portions 8 are zoned only by the groove portions 7. In such a case, the distance between adjacent parallel grooves is the minimum width T of the columnar portions 8. Here, FIG. 9 is a schematic cross-sectional view showing a cross section of another embodiment of a honeycomb structure-forming die of the present invention, the cross-section being similar to that of FIG. 5.

On the other hand, for example, as shown in FIGS. 1 to 5, when the inner diameter of the back holes 6 is larger than the width of the groove portion, the columnar portions 8 are zoned by the outer peripheral edges of the groove portions 6 and the grooves 7. In such a case, by the inner diameter of the back holes 6 or the pitch (i.e., distance between adjacent grooves) of the lattice-shaped groove portions 7, the position of the portion having the minimum width T of the columnar portions 8 may be changed.

For example, as shown in FIGS. 3 to 5, in the case that the columnar portions 8 are zoned by the outer peripheral edges of the back holes 6 and the groove portions 7, when a value (Q−2r) obtained by deducting the radii r of the closest two back holes 6 from the distance Q between the centers of the two back holes 6 is smaller than the distance S between adjacent parallel grooves (Q−2r<S), the value (Q−2r) serves as the minimum width T (T=Q−2r) of the columnar portions 8.

Figure 10:
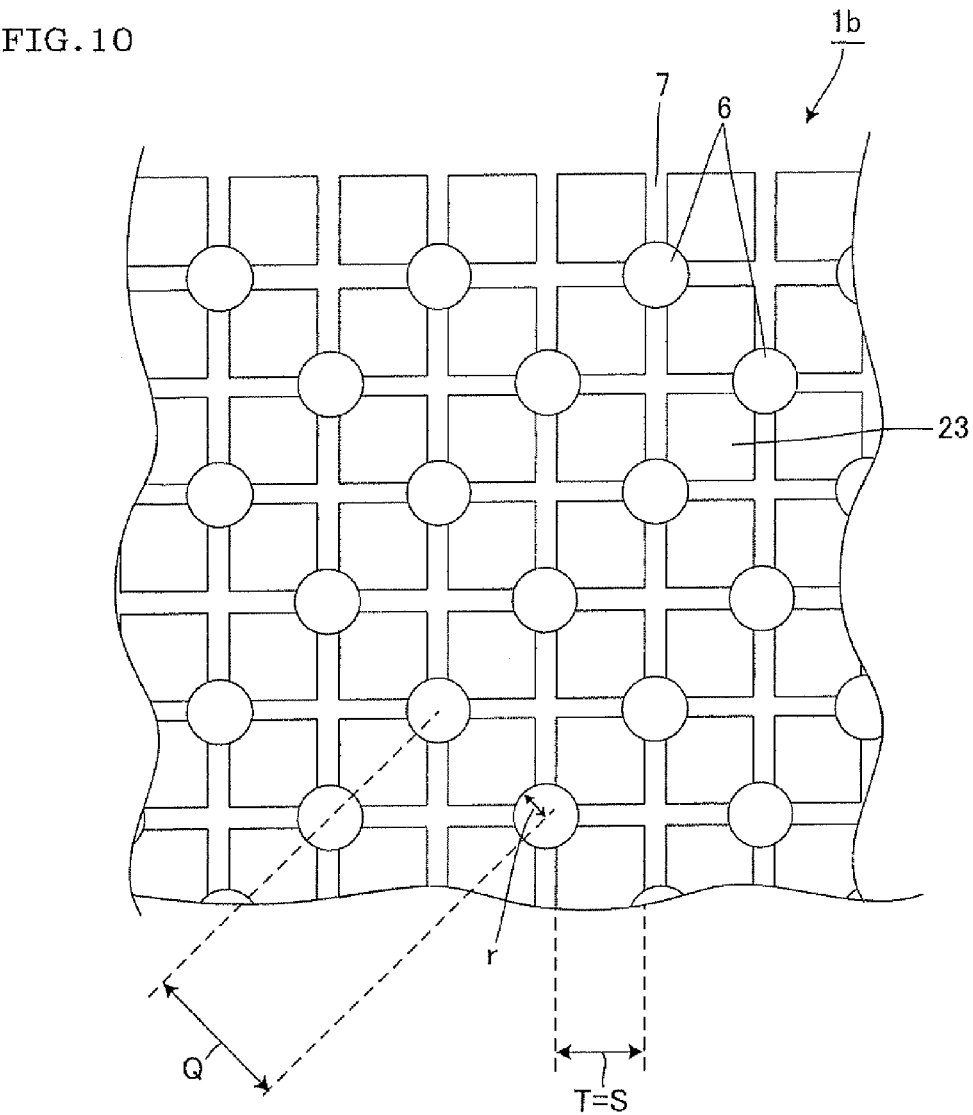
FIG. 10 is an enlarged plan view showing a surface on the bonding face side of the first plate-shaped member constituting another embodiment of a honeycomb structure-forming die of the present invention.

On the other hand, as the honeycomb structure-forming die 1b shown in FIG. 10, when the value (Q−2r) obtained by deducting the radii r of the closest two back holes 6 from the distance Q between the centers of the two back holes 6 is larger than the distance S between adjacent parallel grooves (Q−2r>S), the distance S serves as the minimum width T (T=S) of the columnar portions 8.

Here, FIG. 10 is an enlarged plan view showing a surface on the bonding face side of the first plate-shaped member constituting another embodiment of a honeycomb structure-forming die of the present invention.

In a honeycomb structure-forming die, generally, the inner diameter of the back holes is often made large in order to increase the amount of the raw forming material introduced therein and to improve formability. In a honeycomb structure-forming die of the present invention, the shape as shown in FIG. 3 is preferable. That is, it is preferable that the value (Q−2r) obtained by deducting the radii r of the closest two back holes 6 from the distance Q between the centers of the two back holes 6 is smaller than the distance S between adjacent parallel grooves, where the value (Q−2r) serves as the minimum width T of the columnar portions 8. Such a constitution can make the two plate-shaped members 23 and 24 constituting the die substrate 22 hardly peeled from each other and provide a die 1 excellent in formability.

Figure 11:
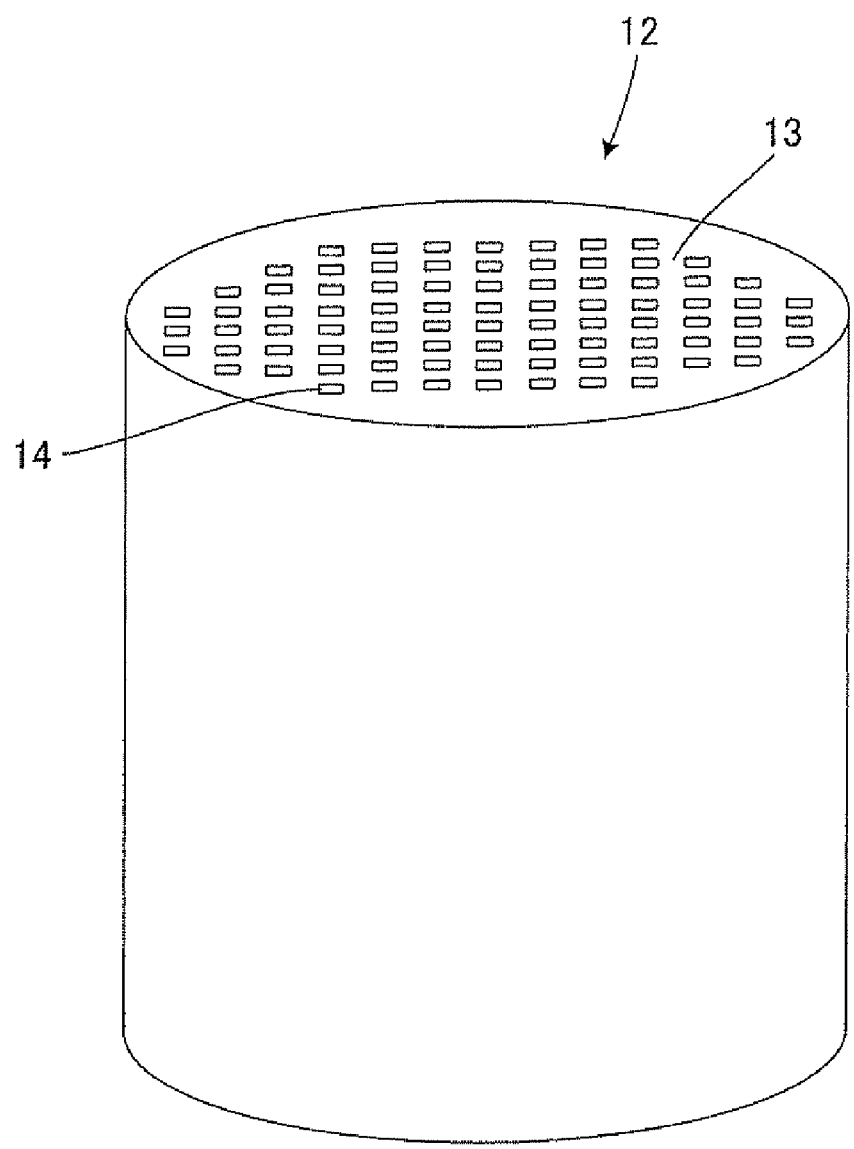
FIG. 11 is a perspective view schematically showing a honeycomb structure extrusion-formed with a die shown in FIG. 1.

The honeycomb structure-forming die of the present embodiment is a die for extrusion-forming, as shown in, for example, FIG. 11, a honeycomb structure 12 having porous partition walls 13 and a plurality of cells 14 functioning as fluid passages and separated and formed by the partition walls 13. Incidentally, the honeycomb structure 12 shown in FIG. 11 can suitably be used as a catalyst carrier using a catalytic function, such as an internal combustion engine, a boiler, a chemical reactor, and a fuel cell reformer; a filter for trapping particulate matter in exhaust gas (particulate matter-trapping filter); or the like.

This slits 5 of the honeycomb structure-forming die 1 shown in FIGS. 1 to 5 are for forming the portions of the partition walls 13 of the honeycomb structure 12 shown in FIG. 11 and are formed in a lattice shape as shown in FIG. 1 so as to correspond with the shape of the partition walls 13.

Incidentally, FIGS. 1 to 5 show an example where the slits 5, back holes 5, and groove portions 7 are formed in the approximate square region in the central portions of the plate-shaped members 23 and 24 having a disc shape. However, the region where the slits and the like are formed is not limited to the above region, and slits and the like may be formed, for example, in a circular region in the central portions of each of the plate-shaped members as shown in FIG. 11, for example, as long as the die functions as a die for extrusion-forming the honeycomb structure 12.

The back holes 6 of the honeycomb structure-forming die 1 are through-holes for introducing a raw forming material. There is no particular limitation on the shape of the back holes 6 as long as the raw forming material introduced into the back holes can be introduced into the slits 5. In the honeycomb structure-forming die 1 shown in FIGS. 1 to 5, the back holes are formed in positions where slits 5 cross each other. Such a constitution enables the raw forming material to spread uniformly over the whole slits 5 upon extrusion-forming using the honeycomb structure-forming die 1 of the present embodiment to be able to realize high formability. Incidentally, in the die 1 shown in FIGS. 1 to 5, the back holes 6 are formed at every other intersection of the slits 5 (or groove portions 7).

The size or the like of the diameter of the openings of the back holes 6 can suitably be determined according to the size of the honeycomb structure-forming die 1, the shape of a honeycomb structure 12 (see FIG. 11) to be extrusion-formed, or the like. For example, the size of the diameter of the openings of the back holes 6 is preferably 10 to 0.1 mm, more preferably 3 to 0.5 mm. Such back holes 6 can be formed by a conventionally known method such as electro-chemical machining (ECM), electro-discharge machining (EDM), laser processing, mechanical processing by a drill or the like, etc.

Since the groove portions 7 formed on the bonding face 28 side of the first plate-shaped member 23 function as buffer portions for introducing the raw forming material introduced from the back holes 6 into the slits 5, the raw forming material introduced from the back holes 6 can be moved smoothly without trouble upon extrusion-forming of the honeycomb structure, and the honeycomb structure can be formed with high accuracy.

Figure 12:
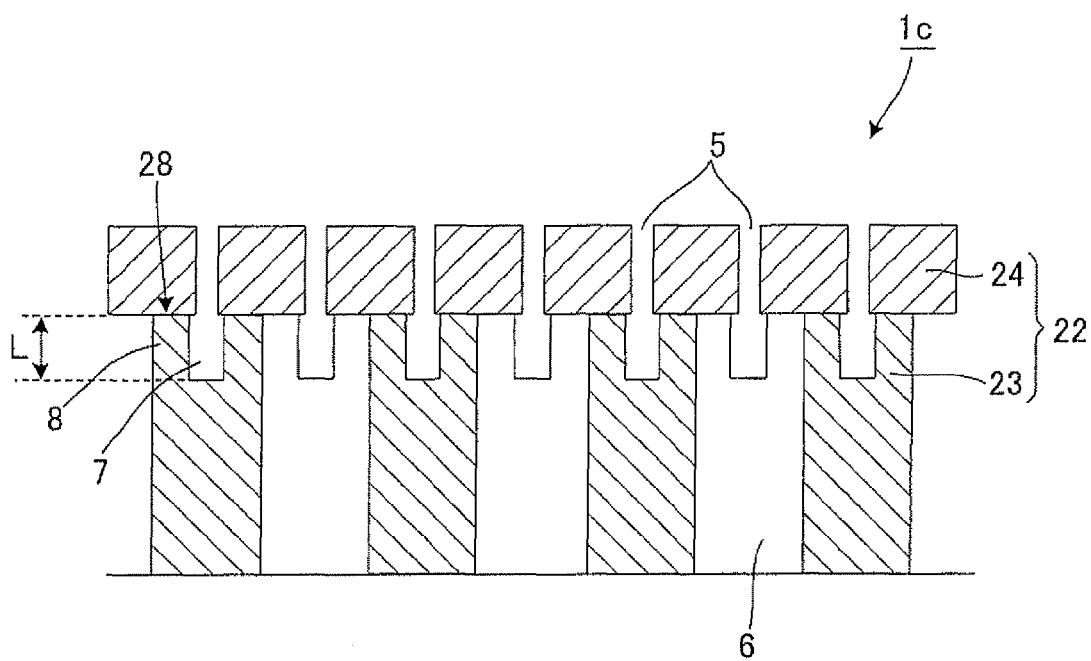
FIG. 12 is a schematic cross-sectional view showing a cross section of another embodiment of a honeycomb structure-forming die of the present invention, the cross-section being similar to that of FIG. 5.

In FIG. 5, the groove portions 7 in the first plate-shaped member 23 and the slits 5 in the second plate-shaped member 24 have about the same width. However, for example, as the honeycomb structure-forming die 1c shown in FIG. 12, the width of the groove portions 7 of the first plate-shaped member 23 may be larger than the width of the slits 5 of the second plate-shaped member 24. Here, FIG. 12 is a schematic cross-sectional view showing a cross section of another embodiment of a honeycomb structure-forming die of the present invention, the cross-section being similar to that of FIG. 5.

In addition, in the honeycomb structure-forming die 1 of the present embodiment as shown in FIGS. 1 to 5, it is preferable that the first plate-shaped member 23 is constituted of a metal or an alloy capable of causing at least one phase transformation selected from the group consisting of martensitic transformation, bainitic transformation, and pearlitic transformation by cooling an austenite phase though it is not particularly limited.

Examples of such a metal or an alloy constituting the first plate-shaped member 23 include a metal or an alloy containing at least one metal selected from the group consisting of iron (Fe), titanium (Ti) nickel (Ni), copper (Cu), and aluminum (Al). In addition, the metal or alloy constituting the first plate-shaped member 23 may further include an additive such as carbon (C), silicon (Si), chromium (Cr), manganese (Mn), molybudenum (Mo), platinum (Pt), and palladium (Pd).

Suitable examples of the alloy constituting the first plate-shaped member 23 include stainless alloy, for example, SUS630 (C: 0.07 or less, Si: 1.00 or less, Mn: 1.00 or less, P: 0.040 or less, S: 0.030 or less, Ni: 3.00 to 5.00, Cr: 15.50 to 17.50, Cu: 3.00 to 5.00, Nb+Ta: 0.15 to 0.45, Fe: balance (unit is mass %)). Such stainless alloys make mechanical processing for forming the back holes 6 relatively easy and are inexpensive materials.

In addition, in the honeycomb structure-forming die 1 of the present embodiment, it is preferable that the second plate-shaped member 24 is constituted of a tungsten based carbide alloy.

The tungsten based carbide alloy is an alloy containing at least tungsten carbide and preferably an alloy obtained by sintering tungsten carbide by at least one metal selected from the group consisting of iron (Fe), cobalt (Co), nickel (Ni), titanium (Ti) and chromium (Cr).

The tungsten based carbide alloy thus using at least a metal selected from the aforementioned group as a bonding material is particularly excellent in abrasion resistance and mechanical strength. Examples of such a tungsten based carbide alloy include a tungsten based carbide alloy using cobalt (Co) as the bonding material. A specific example is a tungsten based carbide alloy containing 0.1 to 50 mass % of cobalt.

There is no particular limitation on thickness of the first plate-shaped member 23 and the second plate-shaped member 24, and the thickness can suitably be determined in consideration of, for example, general shapes of the slits 5 and the back holes 6. For example, in the case of manufacturing a general honeycomb structure-forming die 1, the ratio of the thickness of the first plate-shaped member 23 to the thickness of the second plate-shaped member 24 is preferably 0.1 to 200, more preferably 1 to 10.

In addition, in the honeycomb structure-forming die 1 of the present embodiment, it is preferable to dispose a bonding material (brazing material) between the first plate-shaped member 23 and the second plate-shaped member 24 to bond them together.

As such a bonding material, a conventionally known brazing material (e.g., brazing metal) used when two different kinds of metals or alloys are bonded can be used.

In a conventional die, when such a bonding material is used, a surplus bonding material sometimes remains inside the back holes to deteriorate formability of the die. In a die of the present invention, since it is possible to evaporate the surplus bonding material by heating upon bonding and discharge it outside through the groove portions formed in the first plate-shaped member, the surplus bonding material does not remain inside the back holes or the like.

Suitable examples of the bonding material include a brazing material of a metal or an alloy containing at least one selected from the group consisting of copper (Cu), silver (Ag), gold (Au), nickel (Ni), and aluminum (Al). Incidentally, copper (Cu) or an alloy containing copper (Cu) can particularly suitably be used because of high permeability in a stainless steel suitably usable as the first plate-shaped member.

Such a bonding material may further contain an additive such as palladium (Pd), silicon (Si), tin (Sn), cobalt (Co), phosphorous (P), manganese (Mn), zinc (Zn), and boron (B). A bonding material containing such an additive can improve bonding reliability.

Figure 13:
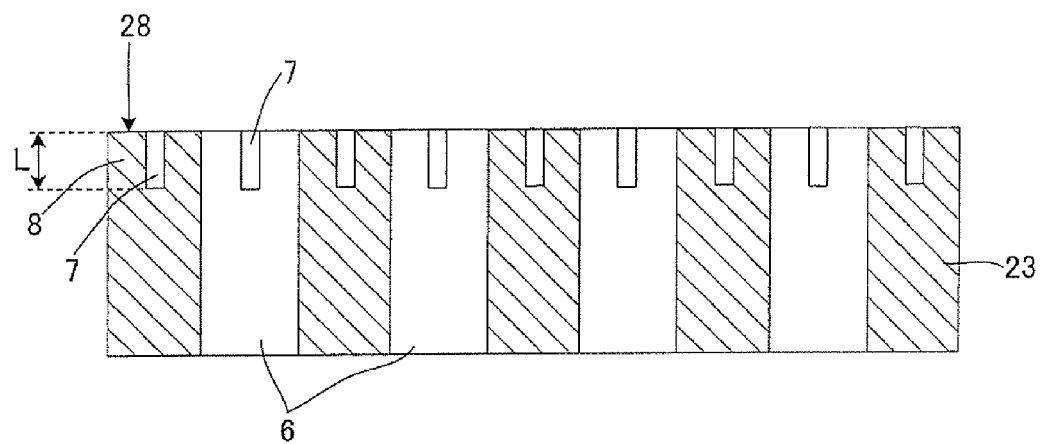
FIG. 13 is an explanatory view showing the step (1) in an embodiment of a method for manufacturing a honeycomb structure-forming die of the present invention and shows a cross-section similar to that of FIG. 5.
Figure 14:
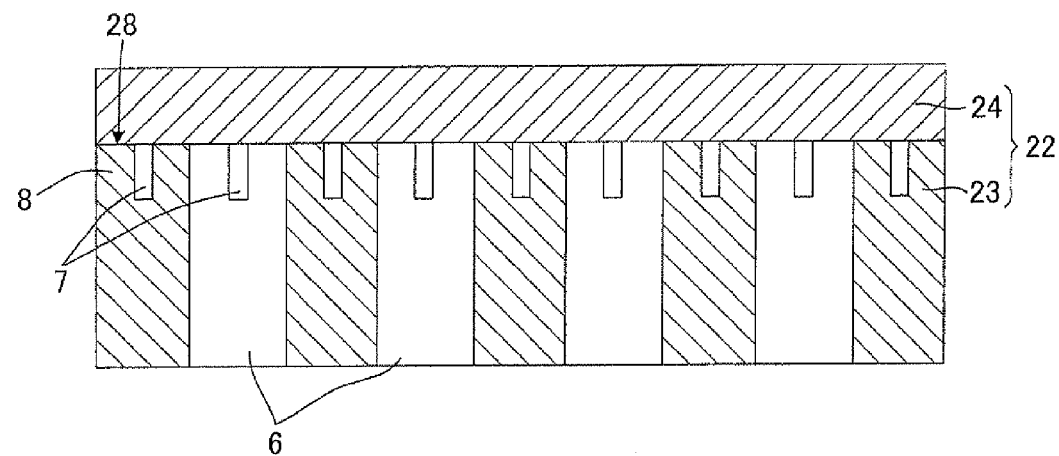
FIG. 14 is an explanatory view showing the step (2) in an embodiment of a method for manufacturing a honeycomb structure-forming die of the present invention and shows a cross-section similar to that of FIG. 5.
Figure 15:
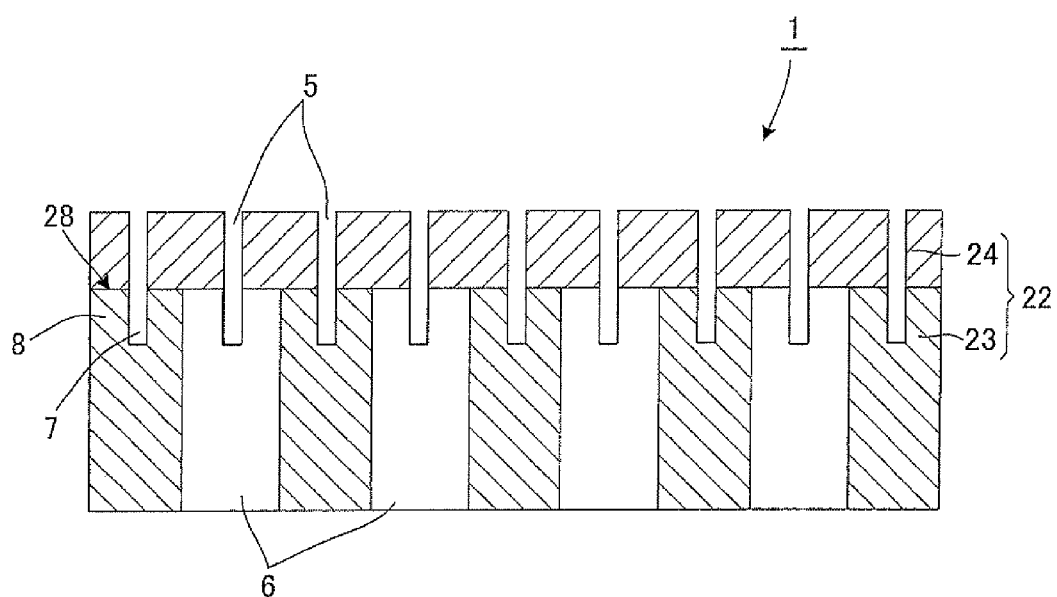
FIG. 15 is an explanatory view showing the step (3) in an embodiment of a method for manufacturing a honeycomb structure-forming die of the present invention and shows a cross-section similar to that of FIG. 5.

[2] Method for manufacturing honeycomb structure-forming die:

Next, one embodiment of a manufacturing method of a honeycomb structure-forming die of the present invention will specifically be described with referring to FIGS. 13 to 15. The manufacturing method of a honeycomb structure-forming die of the present invention is a method for manufacturing an embodiment (honeycomb structure-forming die 1) of a honeycomb structure-forming die of the present invention shown in FIGS. 1 to 5, that is, a method for manufacturing a honeycomb structure-forming die 1 having a plurality of columnar portions 8 where at least a part is zoned by the grooves 8 on the surface 28 side of the first plate-shaped member 23 constituting the die substrate 22. Here, FIGS. 13 to 15 are explanatory views each showing each step in a method for manufacturing the honeycomb structure-forming die of the present embodiment. Incidentally, FIG. 13 to 15 each shows a cross-section similar to that of FIG. 5.

In the manufacturing method of a honeycomb structure-forming die of the present embodiment, in the first place, as shown in FIG. 13, lattice-shaped groove portions 7 are formed on a surface (on the bonding face 28 side in FIG. 1) of the first plate-shaped member 23 of a metal or an alloy (step (1)).

In the step (1), the groove portions 7 are formed on a surface 28 side of the first plate-shaped member 23 in such a manner that the ratio (L/T) of the height L of the columnar portions 8 of a honeycomb structure-forming die 1 obtained as the final product as shown in, for example, FIGS. 1 to 5 to the minimum width T of the columnar portions 8 is within the range from 1/3 to 3.5.

Incidentally, in the manufacturing method of a honeycomb structure-forming die of the present embodiment, the aforementioned ratio (L/T) is within the range of preferably 0.5 to 3, more preferably 0.9 to 2.5.

The first plate-shaped member 23 constitutes a portion where mainly back holes 6 in the die substrate 22 (see FIG. 1) are formed. As the first plate-shaped member 23, there can be used a member constituted of a metal or an alloy used for a conventionally know honeycomb structure-forming die. In particular, in the method for manufacturing a honeycomb structure-forming die of the present embodiment, there can suitably be used the first plate-shaped member constituted of a metal or an alloy capable of causing at least one phase transformation selected from the group consisting of martensitic transformation, bainitic transformation, and pearlitic transformation by cooling an austenite phase.

As such a metal or an alloy, the metals and alloys described above as suitable examples in the embodiment of a honeycomb structure-forming die may be used.

As a method for forming the groove 7, there may suitably be used a conventionally known method such as grinding by a diamond grinding stone or electro-discharge machining.

In addition, in the method for manufacturing a honeycomb structure-forming die of the present embodiment, before forming the groove portions 7 or after forming the groove portions 7 on one surface of the first plate-shaped member 23, the back holes 6 communicating with the groove portions 7 from the other surface of the first plate-shaped member 23 may be formed. For example, in the die 1 shown in FIGS. 3 to 5, since the columnar portions 8 are zoned by the back holes 6 and the groove portions 7, it is preferable to form the back holes 6 together with the groove portions 7 in the step (1).

Though, there is no particular limitation on the method for forming the back holes, a conventionally know method such as electrochemical machining (ECM), electro-discharge machining (EDM), laser processing, or mechanical processing by a drill or the like may suitably be employed.

The back holes may be through-holes passing through the first plate-shaped member 23 to the surface 28 side on one side of the first plate-shaped member 23 as shown in FIG. 13 or blind holes as the die 1a shown in FIG. 9.

Incidentally, in the method for manufacturing a honeycomb structure-forming die of the present invention, it is also possible to form the back holes in a later step, for example, the step (3) or the like after a die substrate is manufactured without forming the back holes in the aforementioned step (1). Incidentally, in the case of forming the back holes in a later step after the step (1), it is necessary to form the groove portions in consideration of the positions of the back holes formed in the first plate-shaped member, the inner diameter of the back holes, and the like. For example, in the case that formation of the back holes influences the size of the minimum width of the columnar portions, the groove portions are formed in consideration of the shape after the back holes are formed.

Next, as shown in FIG. 14, the second plate-shaped member 24 of a metal or an alloy is laminated on the surface 28 on one side of the first plate-shaped member 23 having the groove portions 7 formed therein, and the first plate-shaped member 23 and the second plate-shaped member 24 are bonded together to obtain the die substrate 22 (step (2)).

The second plate-shaped member 24 constitutes mainly the portions where the slits 5 (see FIG. 1) are formed in the die substrate 22 (see FIG. 1) and can suitably be used a member constituted of, for example, tungsten based carbide alloy. As such a carbide alloy, there can be used the carbide alloy described above as a suitable example in the embodiment of a honeycomb structure-forming die of the present invention.

In addition, in the method for manufacturing a honeycomb structure-forming die of the present embodiment, the plate-shaped members 23 and 24 may be bonded by disposing a bonding material between the first plate-shaped member 23 and the second plate-shaped member 24 when the second plate-shaped member 24 is laminated on the surface 28 of the first plate-shaped member 23. As such a bonding material, there may suitably be employed the brazing material described in the aforementioned embodiment of a honeycomb structure-forming die of the present invention.

When the first plate-shaped member 23 and the second plate-shaped member 24 are bonded into a laminate, it is preferable to bond them together by heating the plate-shaped members 23 and 24 at a temperature not lower than the temperature where the first plate-shaped member 23 causes austenite transformation. Such a constitution enables the first plate-shaped member 23 and the second plate-shaped member 24 to be well bonded together.

In addition, in the method for manufacturing a honeycomb structure-forming die of the present embodiment, the metal texture or the alloy texture constituting the first plate-shaped member 23 may be subjected to phase transformation by decreasing the temperature of the die substrate 22 obtained above to the temperature where at least one of the aforementioned phase transformation starts. Thus, by subjecting the first plate-shaped member 23 to phase transformation, the dimensions of the first plate-shaped member 23 can be changed to reduce residual stress in the bonding face 28 between the first plate-shaped member 23 and the second plate-shaped member 24.

In the method for manufacturing a honeycomb structure-forming die of the present embodiment, it is preferable that temperature of the first plate-shaped member 23 and the second plate-shaped member 24 bonded above is decreased to the temperature where the aforementioned at least one phase transformation starts at a temperature falling rate of 0.1 to 100° C./min.

Next, as shown in FIG. 15, the slits 5 corresponding with the shape of the aforementioned groove portions 7 are formed from the surface opposite to the bonding face 28 with the first plate-shaped member 23 of the second plate-shaped member 24 to obtain a honeycomb structure-forming die 1 (step (3)).

There is no particular limitation on the method for forming the slits 5, and a conventionally known method such as grinding with a diamond grinding stone or electro-discharge machining (EDM) may suitably be employed. In addition, in the honeycomb structure-forming die 1 shown in FIG. 1, the slits 5 have a square lattice shape. However, in the method for manufacturing a honeycomb structure-forming die of the present embodiment, the shape of the slits 5 formed in the second plate-shaped member 24 is not limited to a square lattice shape and may be another polygonal lattice shape.

The width of the slits 5 formed in the second plate-shaped member 24 can suitably be determined according to the shape of a honeycomb structure 12 (see FIG. 11) to be formed. For example, in order to manufacture a honeycomb structure-forming die 1 for extrusion-forming a general honeycomb structure, the width of the slits 5 is preferably 5 to 5000 μm, more preferably 10 to 500 μm.

As described above, there can be manufactured a honeycomb structure-forming die 1 where the back holes 6 for introducing a raw forming material and the slits 5 for forming the raw forming material into a lattice shape as shown in FIGS. 1 to 5.

The first plate-shaped member has a disc shape having a diameter of 215 mm and a thickness of 20 mm. The second plate-shaped member has a disc shape having a diameter of 210 mm and thickness of 2.5 mm.

In the first place, the lattice-shaped groove portions having a depth of 1.6 mm and the back holes having an opening diameter of 1.4 mm were formed by electrochemical machining (ECM). The groove portions had a width of 0.3 mm and a pitch of 1.37 mm. In Example 1, the minimum width T of the columnar portions in the end face on the bonding face side was 0.53 mm with the height L of the columnar portions being 1.6 mm, and the ratio (L/T) of the height L to the minimum width T was 3.01.

After the first plate-shaped member and the second plate-shaped member were put into a laminate by disposing a brazing material between them, they were heated at 1120° C. to bond the first plate-shaped member and the second plate-shaped member together to obtain a die substrate.

The die substrate thus obtained was evaluated for peeling at the bonding faces of the first plate-shaped member and the second plate-shaped member. The evaluation results are shown in Table 1. The peeling at the bonding faces was confirmed in ultrasonic crack detection with an ultrasonic crack detection imaging device. Incidentally, "good" was given for the cases where no peeling was found at the bonding faces, and "bad" was given for the cases where peeling was found at the bonding faces.

Next, after the die substrate obtained above was cooled down to ordinary temperature, slits were formed in the second plate-shaped member to obtain a honeycomb structure-forming die. The slits were formed into a square lattice shape with a diamond grinding stone. The slits had a width of 0.1 mm and a pitch of 1.37 mm.

TABLE 1

| | | Example 1 | Example 2 | Example 3 | Example 4 | Example 5 | Example 6 | Example 7 | Example 8 |
|---|---|---|---|---|---|---|---|---|---|
| Groove portion | Depth (mm) | 1.6 | 1.5 | 1.0 | 0.5 | 1.5 | 1.4 | 1.2 | 1.0 |
| | Pitch (mm) | 1.37 | 1.37 | 1.37 | 1.37 | 1.12 | 1.12 | 1.12 | 1.12 |
| Back hole | Inner diameter (mm) | 1.4 | 1.4 | 1.4 | 1.4 | 1.15 | 1.15 | 1.15 | 1.15 |
| Columnar portion | Minimum width (mm) | 0.53 | 0.53 | 0.53 | 0.53 | 0.43 | 0.43 | 0.43 | 0.43 |
| | Height L (mm) | 1.6 | 1.5 | 1.0 | 0.5 | 1.5 | 1.4 | 1.2 | 1.0 |
| | Ratio (L/T) | 3.01 | 2.82 | 1.88 | 0.94 | 3.49 | 3.26 | 2.80 | 2.33 |
| Evaluation on peeling at the bonding faces by ultrasonic crack detection | | Good | Good | Good | Good | Good | Good | Good | Good |

Hereinbelow, the present invention will specifically be described by Examples. However, the present invention is by no means limited to the Examples.

EXAMPLE 1

There was manufactured a honeycomb structure-forming die having back holes for introducing a raw forming material and slits for forming the raw forming material into a lattice shape and being capable of forming a honeycomb structure by extruding from a slit the raw forming material introduced from the back holes.

In Example 1, a die substrate was obtained by bonding the first plate-shaped member constituted of SUS630 (C: 0.07 or less, Si: 1.00 or less, Mn: 1.00 or less, P: 0.040 or less, S: 0.030 or less, Ni: 3.00 to 5.00, Cr: 15.50 to 17.50, Cu: 3.00 to 5.00, Nb+Ta: 0.15 to 0.45, Fe: balance (unit is mass %)) and the second plate-shaped member constituted of a tungsten based carbide alloy containing 16 mass % of cobalt together, and a honeycomb structure-forming die was manufactured by using the die substrate.

EXAMPLES 2 TO 15

The honeycomb structure-forming die in Examples 2 to 15 were manufactured in the same manner as in Example 1 except that the diameter of the openings of the back holes, the depth of the groove portions, and the pitch of the groove portions were changed as shown in Tables 1 and 2. The diameter of the openings of the back holes, the depth of the groove portions, the pitch of the groove portions, the minimum width T of the columnar portions, the height L of the columnar portions, and the ratio (L/T) of each die are shown in Tables 1 and 2.

The honeycomb structure-forming dies of Examples 2 to 15 were evaluated for peeling at the bonding faces of the first plate-shaped member and the second plate-shaped member in the same manner as in Example 1. The evaluation results are shown in Tables 1 and 2.

TABLE 2

|  |  | Example 9 | Example 10 | Example 11 | Example 12 | Example 13 | Example 14 | Example 15 |
|---|---|---|---|---|---|---|---|---|
| Groove portion | Depth (mm) | 0.8 | 0.5 | 1.2 | 1.0 | 0.5 | 0.8 | 0.5 |
|  | Pitch (mm) | 1.12 | 1.12 | 0.91 | 0.91 | 0.91 | 1.44 | 1.44 |
| Back hole | Inner diameter (mm) | 1.15 | 1.15 | 0.9 | 0.9 | 0.9 | 1.8 | 1.8 |
| Columnar portion | Minimum width (mm) | 0.43 | 0.43 | 0.38 | 0.38 | 0.38 | 0.23 | 0.23 |
|  | Height L (mm) | 0.8 | 0.5 | 1.2 | 1.0 | 0.5 | 0.8 | 0.5 |
|  | Ratio (L/T) | 1.86 | 1.16 | 3.13 | 2.61 | 1.31 | 3.47 | 2.17 |
| Evaluation on peeling at the bonding faces by ultrasonic crack detection |  | Good | Good | Good | Good | Good | Good | Good |

EXAMPLES 16 TO 19

The groove portions shown in Table 3 were formed using the same first and second plate-shaped members as in Example 1 to manufacture a honeycomb structure-forming die. In Examples 16 to 19, the back holes in the first plate-shaped member were blind holes as shown in FIG. 9, and the groove portions which reach the blind holes were formed. In these Examples, the distance between adjacent parallel groove portions (i.e., value obtained by deducting the groove width from the pitch of the groove portions) serves as the minimum width of the columnar portions.

The honeycomb structure-forming dies of the Examples 16 to 19 were evaluated for peeling at the bonding faces of the first plate-shaped member and the second plate-shaped member in the same manner as in Example 1. The evaluation results are shown in Table 3.

TABLE 3

|  |  | Example 16 | Example 17 | Example 18 | Example 19 |
|---|---|---|---|---|---|
| Groove portion | Depth (mm) | 2.9 | 1.0 | 2.9 | 1.0 |
|  | Pitch (mm) | 1.37 | 1.37 | 1.12 | 1.12 |
|  | Groove width (mm) | 0.29 | 0.29 | 0.29 | 0.29 |
| Columnar portion | Minimum width (mm) | 1.08 | 1.08 | 0.83 | 0.83 |

TABLE 3-continued

|  |  | Example 16 | Example 17 | Example 18 | Example 19 |
|---|---|---|---|---|---|
|  | Height L (mm) | 2.9 | 1.0 | 2.9 | 1.0 |
|  | Ratio (L/T) | 2.69 | 0.93 | 3.49 | 1.20 |
| Evaluation on peeling at the bonding faces by ultrasonic crack detection |  | Good | Good | Good | Good |

COMPARATIVE EXAMPLES 1 TO 6

The honeycomb structure-forming die in Comparative Examples 1 to 6 were manufactured in the same manner as in Example 1 except that the diameter of the openings of the back holes, the depth of the groove portions, and the pitch of the groove portions were changed as shown in Table 1. The diameter of the openings of the back holes, the depth of the groove portions, the pitch of the groove portions, the minimum width T of the columnar portions, the height L of the columnar portions, and the ratio (L/T) of each die are shown in Table 4.

The honeycomb structure-forming dies of Comparative Examples 1 to 6 were evaluated for peeling at the bonding faces of the first plate-shaped member and the second plate-shaped member in the same manner as in Example 1. The evaluation results are shown in Table 4.

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Groove portion | Depth (mm) | 3.0 | 3.0 | 1.6 | 1.6 | 1.5 | 1.6 |
|  | Pitch (mm) | 1.37 | 1.12 | 1.12 | 0.91 | 0.91 | 1.44 |
| Back hole | Inner diameter (mm) | 1.4 | 1.15 | 1.15 | 0.9 | 0.9 | 1.8 |
| Columnar portion | Minimum width (mm) | 0.53 | 0.43 | 0.43 | 0.38 | 0.38 | 0.23 |
|  | Height L (mm) | 3.0 | 3.0 | 1.6 | 1.6 | 1.4 | 1.6 |
|  | Ratio (L/T) | 5.64 | 6.99 | 3.73 | 4.18 | 3.65 | 6.94 |
| Evaluation on peeling at the bonding faces by ultrasonic crack detection |  | Bad | Bad | Bad | Bad | Bad | Bad |

(Results)

In each of the honeycomb structure-forming dies of the Examples 1 to 19, peeling was not confirmed, and two plate-shaped members were firmly bonded together. The bonding strength at the aforementioned bonding faces was strong enough to withstand the pressure upon extrusion-forming of a honeycomb structure, and peeling was not caused at the bonding faces of the two plate-shaped members constituting the die substrate even when the total extrusion distance reached 10,000 m or more. Further, since the honeycomb structure-forming dies were excellent in formability, honeycomb structures (honeycomb formed articles) could be well formed.

On the other hand, each of the honeycomb structure-forming dies of the Comparative Examples 1 to 6, peeling was confirmed at the bonding faces in the evaluation on peeling at the bonding faces of the die substrate. Therefore, there were the cases that the two plate-shaped members constituting the die substrate peeled from each other at the time of forming the slits in the die substrate and that the two plate-shaped members constituting the die substrate peeled from each other due to the pressure upon extrusion-forming a honeycomb structure even in the case that they did not peel from each other at the time of forming the slits.

A honeycomb structure-forming die of the present invention can be used upon forming a catalyst carrier using a catalytic function, such as an internal combustion engine, a boiler, a chemical reactor, and a fuel cell reformer; a filter for trapping particulate matter in exhaust gas. In addition, a manufacturing method for a honeycomb structure-forming die of the present invention enables to simply manufacture the aforementioned honeycomb structure-forming die.

What is claimed is:

1. A honeycomb structure-forming die comprising a die substrate having a first plate-shaped member provided with back holes formed for introducing a raw forming material and a second plate-shaped member provided with slits for forming the raw forming material into a lattice shape,
   wherein the first plate-shaped member has a plurality of columnar portions where at least a part is zoned by a slit-shaped groove portion corresponding with a shape of the slit on a bonding face side where the first plate-shaped member is bonded with the second plate-shaped member, and
   in the columnar portions, the ratio (L/T) of the height L of the columnar portions to the minimum width T in an end face on the bonding face side is within the range from 1/3 to 3.5, the height L is in the range of from 0.5 to 2.9 mm, and the minimum width T is in the range of from 0.23 to 1.08 mm.

2. The honeycomb structure-forming die according to claim 1, wherein the columnar portions are zoned by an outer peripheral edge of the back hole and the groove, and the minimum width T is shown by a value (Q−2r) obtained by deducting radii of closest two back holes from a distance Q between the centers of the two back holes.

3. The honeycomb structure-forming die according to claim 1, wherein the second plate-shaped member is constituted of a tungsten based carbide alloy.

4. The honeycomb structure-forming die according to claim 1, wherein the first plate-shaped member is constituted of a metal or an alloy capable of causing at least one phase transformation selected from the group consisting of martensitic transformation, bainitic transformation, and pearlitic transformation by cooling an austenite phase.

5. A method for manufacturing a honeycomb structure-forming die comprising:
   a step (1) for forming lattice-shaped grooves on a surface on one side of a first plate-shaped member of metal or alloy,
   a step (2) for obtaining a die substrate by disposing a second plate-shaped member of metal or alloy on the surface on the one side of the first plate-shaped member to bond the first plate-shaped member with the second plate-shaped member, and
   a step (3) for obtaining a honeycomb structure-forming die, as recited by claim 1, by forming slits corresponding to a shape of the grooves from the surface on the side opposite to the bonding face bonded with the first plate-shaped member of the second plate-shaped member;
   wherein the honeycomb structure-forming die has a plurality of columnar portions where at least a part is zoned by the groove on a surface on the one side on the first plate-shaped member constituting the die substrate, and
   the groove portions are formed in the step (1) in such a manner that the ratio (L/T) of the height L of the columnar portions to the minimum width T of the columnar portions is in the range from 1/3 to 3.5, the height L is in the range of from 0.5 to 2.9 mm, and the minimum width T is in the range of from 0.23 to 1.08 mm.

6. The method for manufacturing a honeycomb structure-forming die according to claim 5, wherein a member constituted of a tungsten based carbide alloy is used as the second plate-shaped member.

7. The method for manufacturing a honeycomb structure-forming die according to claim 5, wherein a member constituted of a metal or an alloy capable of causing at least one phase transformation selected from the group consisting of martensitic transformation, bainitic transformation, and pearlitic transformation by cooling an austenite phase is used as the first plate-shaped member.

8. The method for manufacturing a honeycomb structure-forming die according to claim 5, wherein back holes for introducing the raw forming material at the time of forming are formed in the first plate-shaped member in the step (1).

9. The method for manufacturing a honeycomb structure-forming die according to claim 7, wherein back holes for introducing the raw forming material at the time of forming are formed in the first plate-shaped member in the step (1).

10. The honeycomb structure-forming die according to claim 1, wherein the ratio (L/T) of the height L of the columnar portions to the minimum width T in an end face on the bonding face side is within the range from 0.5 to 3.

11. The honeycomb structure-forming die according to claim 1, wherein the ratio (L/T) of the height L of the columnar portions to the minimum width T in an end face on the bonding face side is within the range from 0.9 to 2.5.

* * * * *